United States Patent [19]

Kubota et al.

[11] Patent Number: 5,376,993
[45] Date of Patent: Dec. 27, 1994

[54] OPTICAL AXIS CORRECTION LENS DEVICE

[75] Inventors: Shigeo Kubota; Michio Oka, both of Kanagawa, Japan

[73] Assignee: Sony Corporation, Tokyo, Japan

[21] Appl. No.: 126,192

[22] Filed: Sep. 24, 1993

[30] Foreign Application Priority Data

Sep. 30, 1992 [JP] Japan .................................. 4-285350

[51] Int. Cl.$^5$ ................................................ G03B 7/08
[52] U.S. Cl. ..................... 354/430; 348/208; 359/557
[58] Field of Search .................. 354/70, 430; 358/222; 359/557, 677, 819; 348/208

[56] References Cited

U.S. PATENT DOCUMENTS 4,978,205  12/1990  Sato ........................................ 359/557

Primary Examiner—Howard B. Blankenship
Attorney, Agent, or Firm—Jay H. Maioli

[57] ABSTRACT

A system for correcting for positional deviations in a hand-held video camera caused by small movements or shaping of the user's hands includes an afocal optical system constituted by a positive meniscus lens and a negative meniscus lens. The positional deviations of the camera caused by minute tremors or shaking of the user's hands are detected by a pitch sensor and a roll sensor and a micro-computer is responsive to the detected amount of the positional deviations to drive the positive meniscus lens and the negative meniscus lens in vertical and horizontal directions with respect to the optical axis, thereby controlling the position of the image pickup light being radiated onto a CCD image sensor of the video camera.

7 Claims, 7 Drawing Sheets

OBJECT DISTANCE

OPTICAL AXIS CORRECTION LENS DEVICE

BACKGROUND OF THE INVENTION

1. Field of the Invention

This invention relates to an optical axis correction lens device that may be employed advantageously in an optical system for a hand-held type video camera and, more particularly, to a device for compensating the adverse effects of shaking and oscillations in such hand-held video camera.

2. Description of the Background

The hand-held video camera, provided with a so-called CCD image sensor, is now becoming quite popular. The hand-held video camera, however, has a drawback that because it is small-sized and lightweight it easily undergoes small positional deviations caused by fine oscillations of the user's hand during the pickup and recording of an image. In such case, when an image is picked up using a zoom lens, the reproduced image is subject to fine "wobbling" and hence presents difficulties when subsequently viewing the recorded, zoomed image.

Although these deviations may be prevented from occurring by securing the video camera device on a tripod during the image pickup and recording, this involves an extremely laborious operation and detracts from high operability of the portable, hand-held video camera.

There are known some techniques for correcting or compensating the positional deviations of the video camera. Such known techniques of correcting the deviations on the side of the video camera may be classified into systems that detect the deviations by picture processing based on movements of an object and systems that detect movements of the main body of the video camera by a deviation sensor and that directly detect an angular velocity of the deviations.

The former system for correcting deviations of the camera device held by the user's hand by picture processing lends itself to construction on an IC chip and, hence, to a reduction in size of the video camera, because picture signals produced on picking up the image of an object are processed into corresponding data. In such picture processing system, when the deviations of the camera device caused by fine oscillations of the user's hand are detected, part of the raster-like picture imaged on the CCD image sensor is taken out and moved in accordance with the picture of a previous field, until coincidence or a steady state is reached. In such case, the partial picture thus taken out is enlarged to an original picture size so as to be recorded on a video tape. This leads to an inconvenience that not only is the resolution lowered, because the original information is displayed only partially on the screen, but also the deviations of the camera device caused by fine movements of the user's hand can be corrected only within a limited range. Besides, if the object is moving in a fashion similar to the movements produced by the deviations of the hand-held camera, these object movements are apt to be mistaken for deviations of the camera and unintentionally removed or compensated. In addition, in places with poor illumination or weak ambient light, the movements of the object and hence the deviations of the hand-held video camera caused by fine movements of the user's hand occasionally cannot be detected.

On the other hand, a gimbal mechanical system has been known as constituting the latter system for optically correcting the deviations of the camera device caused by fine movements of the user's hand. This gimbal mechanical system, which involves moving the entire lens unit in a direction for canceling the deviations of the camera caused by shaking of the user's hand does not cause deterioration in resolution and permits correction over a broader range. Nevertheless, because the entire lens unit is moved, the overall camera system is increased in size while leading to a considerable increase in power consumption.

Thus, the above two proposed shake compensations systems each have their merits and demerits and, hence, cannot be adopted without modifications in some form or other.

In consideration of such adaptations, a video camera system shown in FIG. 10 has been developed that makes the best use of the merits of the above-described two systems. This video camera includes a pitch sensor 100 for detecting the pitching of the main body of the video camera, a roll sensor 101 for detecting the rolling of the main body of the video camera, an active prism 102 that exhibits performance equivalent to the benefit achieved with a gimbal mechanical system but yet is reduced in size, a micro-computer 103 for driving and controlling the active prism 103 based on detection signals from the pitch sensor 100 and the roll sensor 101, and a CCD image sensor 104 for receiving an image pickup light radiated via the active prism 103 for generating image signals by photo-electric conversion.

The active prism 102 is formed of two round glass plates 102a, 102b interconnected by an expandable bellows 102c made of a special film material, and a liquid having the same refractive index as that of the glass plates 102a, 102b. The front glass plate 102a, on which the image pickup light falls, is provided with a transverse shaft 102d for deviating or tilting the front side glass plate 102a in the vertical or pitch direction, while the rear glass plate 102b, out of which the image pickup light is radiated, is provided with a vertical shaft 102e for deviating or tilting the front side glass plate 102b in the transverse or roll direction.

The shafts 102d, 102e are provided respectively with driving coils 105, 106 across which an electrical voltage may be applied for causing independent movements of the two glass plates 102a, 102b in accordance with the values of the applied voltage.

If the two glass plates 102a, 102b are parallel to each other, the active prism acts as a single glass plate, that is, it acts similarly to a system consisting of a transparent filter placed ahead of a lens, such that the image pickup light incident thereon is radiated directly without undergoing deflection.

If the main body of the camera is directed upward by the deviations caused by fine movements of the user's hand, the front side glass plate 102a is driven so as to be directed partially upward so that the optical axis of the image pickup light is deflected downward via the active prism 102. In this manner, the deviations of the camera caused by fine movements of the user's hand may be corrected over a wider range than with the picture processing system, without undergoing deterioration in resolution or fluctuations in the angle of the image field.

Meanwhile, the angle of inclination of the active prism 102 is typically set to be ±3° at the maximum, for example, while the maximum range of correction of the deviations of the camera caused by fine movements of the user's hand, in terms of the angle of tilt of the optical axis, is ±1.5°.

In the operation of the above-described video camera, when the image pickup operation is started, the pitch sensor 100 and the roll sensor 101, acting as angular sensors, detect the deviations of the camera device caused by fine movements of the user's hand to generate a pitch detection signal and a roll detection signal, which are respectively supplied to an amplification circuit 107. The amplification circuit 107 amplifies the pitch detection signal and the roll detection signal and supplies the amplified signals to an A/D converter 108. The A/D converter 108 digitizes the pitch detection signal and the roll detection signal to form pitch detection data and roll detection data, which are respectively supplied to the micro-computer 103.

Because the pitch detection data and roll detection data are in the form of angular acceleration data, the micro-computer 103 performs an integrating operation on these data to form angle data. This enables detection of the angular changes of the camera caused by fine movements of the user's hand, that is, shaking of the camera.

The micro-computer 103 then checks if the angular change produced as the angular data has been caused by the deviations of the camera as a result of fine movements of the user's hand or has been caused by panning, which is transverse swinging of the video camera during imaging, or by tilting, which is vertical swinging of the video camera device during imaging.

Specifically, the micro-computer 103 determines that a large but slow angular change is being caused by panning/tilting, so that it is not responsive to such large, slow angular change.

If the micro-computer 103 determines that the angular change is being caused by deviations of the camera device as a result of fine movements of the user's hand, it detects an amount of the angle of correction from the angular data and forms two correction data, that is, correction data in both the pitch and roll directions, and transmits the correction data to a comparator 109.

The active prism 102 is controlled by inclination angle or tilt sensors 111, 112, provided on the front and back sides of the glass plates 102a, 102b, respectively. More specifically, the inclination angle sensors 111, 112 detect the inclination of the front and back side glass plates 102a, 102b of the active prism 102 to form front glass plate inclination detection data and back glass plate inclination detection data, which are supplied to the comparator 109. The comparator 109 compares the two correction data in the pitch and roll directions, supplied from micro-computer 103, to the front glass plate inclination detection data and back glass plate inclination detection data supplied from the inclination angle sensors 111, 112, respectively, and transmits comparison data to a driving coil driver 110.

The driving coil driver 110 is responsive to the comparison data to control the amount and the polarity of the current supplied to the driving coils 105, 106 that drive the front and back side glass plates 102a, 102b, respectively.

This causes the active prism 102 to be controlled such that it is inclined by an angle equivalent to the deviations of the camera device as a result of fine movements of the user's hand.

Consequently, the image pickup light L reflected from the image to be recorded, indicated by a broken line in FIG. 10, has its optical axis corrected by the active prism 102 by an amount corresponding to the deviations of the camera caused by fine movements of the user's hand and is radiated onto the CCD image sensor 104 via a zoom lens 113 for an enlarged size image pickup of the object.

In this manner, it is possible with the above-described video camera to correct the optical axis of the image pickup light by the active prism 102 in accordance with the deviations of the camera device caused by fine movements of the user's hand so that the image pickup light is corrected as to the optical axis that it is radiated on the CCD image sensor 104, thereby preventing the "wobbling" of the reproduced picture.

Nevertheless, the above-described shaking compensated video camera suffers from a problem in that because it makes use of the above-mentioned active prism 102 having the liquid of the same refractive index as that of the glass plates 102a, 102b charged into a space defined between these glass plates 102a, 102b, it is highly probable that air bubbles be generated in the liquid under a low atmospheric pressure, thereby rendering it impossible to effect accurate correction of the deviations of the camera device caused by fine movements of the user's hand.

OBJECTS AND SUMMARY OF THE INVENTION

Accordingly, it is an object of the present invention to provide a system for compensating shaking and wobbling of a camera caused by movements of the user's hands that can overcome the above-noted defects inherent in the prior art.

It is another object of the present invention to provide an optical axis correction lens device including a negative meniscus lens having non-spherical light incident and light outgoing surfaces, a positive meniscus lens having non-spherical light incident and light outgoing surfaces, and lens driving means for effecting optical axis correction by driving either the negative meniscus lens or the positive meniscus lens in a direction perpendicular to the optical axis in response to optical axis correcting signals, wherein the negative meniscus lens and the positive meniscus lens constitutes an afocal optical system. According to one embodiment, the negative meniscus lens and the positive meniscus lens are achromatic compound lenses. In addition, the positive meniscus lens is convex toward the light outgoing side, whereas the negative meniscus lens is convex toward the light incident side. Also, the negative meniscus lens is arranged downstream of the positive meniscus lens along the light path of the image pickup light.

In one embodiment the present invention provides a camera including an image pickup section for receiving an image pickup light and outputting image pickup signals, a condensor lens for condensing the image pickup light onto the image pickup section, an optical axis correction lens provided upstream of the condensor lens along the optical axis of the image pickup section and including a negative meniscus lens having non-spherical light incident and light outgoing surfaces and a positive meniscus lens having non-spherical light incident and light outgoing surfaces, a lens driver for driving the negative meniscus lens and the positive meniscus lens in a direction perpendicular to the optical axis, means for detecting wobbling of a main camera body and a detector system for controlling the lens driver in accordance with the detector system.

With the optical axis correction device according to an embodiment of the present invention, the negative meniscus lens having non-spherical light incident and light outgoing surfaces and the positive meniscus lens having non-spherical light incident and light outgoing surfaces constitute an afocal optical system, and the lens driver is responsive to optical axis correcting signals to drive the negative and positive meniscus lenses in a direction perpendicular to the optical axis.

With the optical axis correction device according to this embodiment of the present invention, the negative meniscus lens and the positive meniscus lens are each formed by achromatic compound lenses for inhibiting chromatic aberration otherwise produced by such an optical axis correction system.

With the optical axis correcting device according to this embodiment of the present invention, the positive meniscus lens is convex toward the light outgoing side and the negative meniscus lens is convex toward the light incident side to inhibit generation of offset aberration.

Also, with the optical axis correction device according to the present invention, the first surface of the afocal optical system has a thickness of 3 mm, a radius of curvature of −1185.1872 mm to −275.242 mm, a refractive index of 1.492838, a conical coefficient of −2530.91174 to −311.595366, a fourth non-spherical coefficient of −0.544656e - 5 to −0.430369e - 5, a sixth non-spherical coefficient of −0.360458e - 7 to −0.335883e - 7, an eighth non-spherical coefficient of 0.294516e - 10 to 0.445597e - 10 and a tenth non-spherical coefficient of −0.712148e - 13 to −0.120117e - 12. The second surface of the afocal optical system has a thickness of 1 mm, a radius of curvature of −91.49586 mm to −74.16998 mm, a refractive index of 1, a conical coefficient of 14.790912 to 17.162173, a fourth non-spherical coefficient of −0.888377e - 6 to −0.133806e - 5, a sixth non-spherical coefficient of −0.368041e - 7 to −0.315414e - 7, an eighth non-spherical coefficient of 0.836518e - 10 to 0.596615e - 10 and a tenth non-spherical coefficient of −0.196851e - 12 to −0.122933e - 12. The third surface of the afocal optical system has a thickness of 2 mm, a radius of curvature of −51.94066 mm to −39.12113 mm, a refractive index of 1.492838, a conical coefficient of −30.848783 to −25.30828, a fourth non-spherical coefficient of −0.543052e - 5 to −0.442550e - 5, a sixth non-spherical coefficient of −0.4769997e - 7 to −0.394558e - 7, an eighth non-spherical coefficient of −0.135683e - 9 to 0.118486e - 9 and a tenth non-spherical coefficient of −0.148924e - 12 to −0.135664e - 12. The fourth surface of said afocal optical system has a radius of curvature of −111.19628 mm to −65.96111 mm, a refractive index of 1, a conical coefficient of −128.717973 to −79.220816, a fourth non-spherical coefficient of −0.849493e - 5 to −0.777955e - 5, a sixth non-spherical coefficient of −0.752038e - 8 to −0.226930e - 8, an eighth non-spherical coefficient of −0.172622e - 10 to 0.156363e - 10 and a tenth non-spherical coefficient of −0.39786e - 13 to −0.515843e - 14, all of which are selected to inhibit generation of offset aberration.

The above and other objects, features, and advantages of the present invention will become apparent from the following detailed description of illustrative embodiments thereof to be read in conjunction with the accompanying drawings.

DESCRIPTION OF PREFERRED EMBODIMENTS

Figure 1:
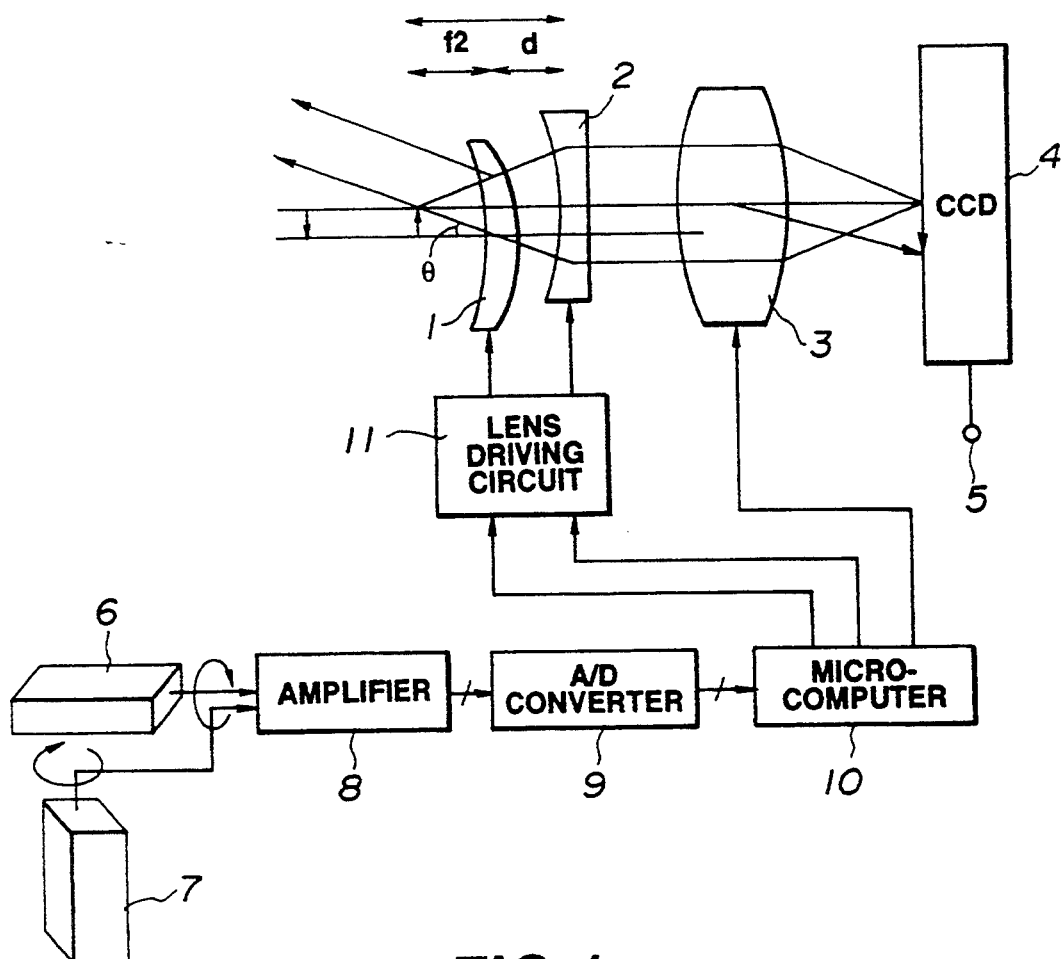
FIG. 1 is a block diagram of an optical axis correction lens device according to an embodiment of the present invention, as mounted on a hand-held type video camera.

The optical axis correction lens device according to an embodiment of the present invention that may be provided as an optical system for a hand-held type video camera is shown in FIG. 1 and includes a positive meniscus lens 1, having non-spherical image pickup light incident and outgoing surfaces, a negative meniscus lens 2, having non-spherical image pickup light incident and outgoing surfaces, arranged downstream of the positive meniscus lens 1, a zoom lens 3 arranged downstream of the negative meniscus lens 2, and a CCD image sensor 4 for receiving the image pickup light radiated thereon via the zoom lens 3 to effect photoelectric conversion and generate an output image pickup signal corresponding to the image pickup light.

The video camera system also includes a pitch sensor 6 for detecting pitch movements of the main body of the video camera to form an output analog pitch detection signal, a roll sensor 7 for detecting the roll movement of the main body of the video camera to form an output analog roll detection signal, an amplification circuit 8 for amplifying the pitch detection signal and the roll detection signal and outputting the amplified signals, and an A/D converter 9 for digitizing the pitch and roll detection signals from the amplification circuit 8 and forming digital output pitch and roll detection data. The video camera also includes a micro-computer 10 for providing drive control signals for driving the positive meniscus lens 1 in the vertical direction and for driving the negative meniscus lens 2 in the horizontal direction with respect to the optical axis in accordance with the pitch detection data and the roll detection data from the A/D converter 9, and a lens driving circuit 11 for driving the positive meniscus lens and the negative meniscus lens 2 as described above in response to the lens drive control signals from the micro-computer 10.

The positive meniscus lens 1 and the negative meniscus lens 2 are designed as achromatic compound lenses, with the two lenses making up an afocal optical system. The positive meniscus lens is arranged so as to be convex toward the light outgoing side, while the negative meniscus lens is arranged so as to be concave toward the light incident side.

In one embodiment the positive meniscus lens 1 and the negative meniscus lens 2 are both formed of acrylic resin, with n=1.491, and the nominal effective diameters and weights of the lenses 1 and 2 being 24 mm and 1.5 g, respectively. The focal lengths of the positive meniscus lens 1 and the negative meniscus lens 2 are 201 mm and 200 mm, respectively.

In the operation of the above-described hand-held type video camera provided with the optical axis correcting device according to the embodiment of the present invention, when the video camera starts its image pickup operation of an object, the image pickup light is radiated on the CCD image sensor 4 via the positive meniscus lens 1, the negative meniscus lens 2 and the zoom lens 3 and an iris, not shown.

When a zoom-in button, not shown, is turned on, the micro-computer 10 controls the focal length of the zoom lens 3 for gradually enlarging the image size of the object up to a predetermined magnification factor, as long as the zoom-in button 3 remains turned on. Similarly, when a zoom-out button, not shown, is turned on, the micro-computer 10 controls the focal length of the zoom lens 3 for gradually diminishing the image size of the object down to a predetermined magnification factor as long as the zoom-out button 3 remains turned on.

The CCD image sensor 4 receives the image pickup light to effect a photo-electric conversion and form an image pickup signal that is fed out at an output terminal 5. The image pickup signal at output terminal 5 is processed in an image pickup signal processing circuit, not shown, with sampling, adding synchronizing signals or the like, before being supplied to a recording circuit. In this manner, image pickup signals corresponding to the object are formed on a video tape, such as by helical scan recording.

If positional deviations of the camera caused by minute vibrations of the user's hand should occur during image pickup, the pitch sensor 6 detects any pitch movement contained in such positional deviations and forms an analog pitch detection signal supplied to the amplification circuit 8. The roll sensor 7 senses any roll movements contained in these positional deviations to form an analog rolling detection signals similarly supplied to the amplification circuit 8. The amplification circuit 8 amplifies the pitch detection signals and the roll detection signals and transmits the amplified signals to the A/D converter 9.

The A/D converter 9 digitizes the pitching detection signals and the rolling detection signals to form pitch detection data and roll detection data supplied to the micro-computer 10.

The micro-computer 10 detects the state of the positional deviations of the camera caused by fine movements of the user's hand and provides detection output signals to a lens driving circuit 11. The lens driving circuit 11 drives the positive meniscus lens 1 and the negative meniscus lens 2 in perpendicular and horizontal directions with respect to the optical axis of the imaging light, respectively, depending on the state of detection of the oscillations of the camera device held by the user's hand.

Because the optical axis of the imaging light radiated on the CCD image sensor 4 is changed in response to the positional deviations of the camera as a result of the fine movements of the user's hand, it is possible for the video camera to cancel these deviations in the image pickup of the object.

Figure 2:
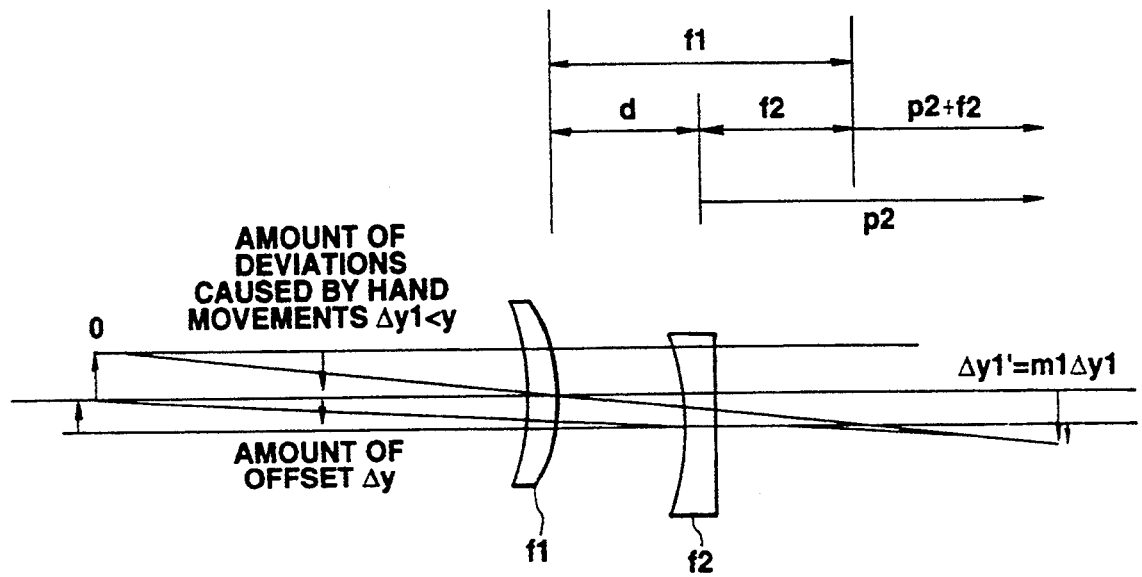
FIG. 2 is a schematic illustrating the operation of correcting oscillations of the camera held by the user's hand by the optical axis correction lens device shown in FIG. 1.

FIG. 2 shows an example in which, with the focal length f1 of the positive meniscus lens 1 and the focal length f2 of the negative meniscus lens 2, the positive meniscus lens 1 is moved by $\Delta y1$ along with the zoom lens 3 as a result of the positional deviations of the camera caused by fine movements of the user's hand, with the negative meniscus lens 2 being moved by $\Delta y$ with respect to the optical axis. If $f1-f2=d$, where d is a distance between the positive meniscus lens 1 and the negative meniscus lens 2, since a magnification factor of the entire system, m1 times m2, is approximately equal to unity without regard to a distance of the object p1, a virtual image is shifted transversely in the vicinity of the object position by the offsetting of the negative meniscus lens 2. That is, the object is imaged as if the image pickup light were reflected by the correcting system acting as a mirror. If the above relations are expressed by mathematic equations, the magnification factors of the positive meniscus lens 1 and the negative meniscus lens 2 are represented by the following equations (1) and (2).

$$m1 = f1/(f1+p1) \quad (1)$$

$$m2 = f2/(f2+p2) \quad (2)$$

If the amount of offset is indicated by $\Delta y$, the condition under which the virtual image shifted transversely as described above is positioned on the optical axis of the lens system which has suffered from the positional deviations of the camera caused by fine movements of the user's hand is given by equation (3).

$$\Delta y - \Delta y' = \Delta y/m2 \quad (3)$$

Modifying equation (3), $(1-1/m2)\, \Delta y = \Delta y1'$ holds, thus obtaining equation (4).

$$\begin{aligned} \Delta y &= \Delta y1'\, m2/(m2-1) \\ &= \Delta y1\, m1 m2/(m2-1) \end{aligned} \quad (4)$$

On the other hand, since $m2-1=-p2/(f2+p2)$, the positional deviations of the camera caused by fine movements of the user's hand is given by the following equation (5).

$$\begin{aligned} \Delta y1 &= \Delta y\,(m2 - 1)/m1m2 \\ &= \Delta y\,(-p2)/\{m1m2\,(f2 + p2)\} \\ &= \Delta y\,(-p2)/(m1m2) \end{aligned} \quad (5)$$

In equation (5), since p2=p1 and −d=m1p1−d holds, the coefficient p2/(m1f2) is given by equation (6).

$$p2/(m1f2) = p1/f2 - d/m1f2 \quad (6)$$

In equation (6), if the second term on the right side may be ignored, the right side becomes a quotient of the distance of the object divided by the focal length of the negative meniscus lens 2.

Consequently, if the approximation of setting the lens distance so as to be small as compared to the image plane distance (p1′=m1p1) holds sufficiently, it suffices that $\Delta y/f2 = \tan\Theta$ holds.

According to the present invention, the focal length of the entire lens device, including the zoom lens 3, is not changed by the optical axis correcting system constituted by the positive meniscus lens 1 and the negative meniscus lens 2.

Figure 3:
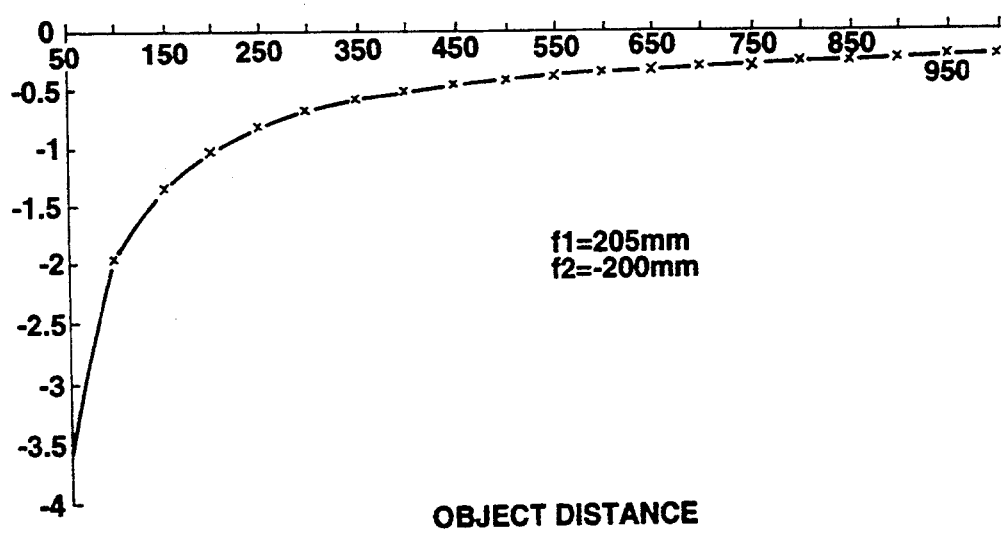
FIG. 3 is a chart showing relative displacement required for correcting 1 mm oscillations of the camera held by the user's hand with the optical axis correction lens device shown in FIG. 1.

Specifically, with a focal length f1 of the positive meniscus lens 1 of 205 mm and a focal length f2 of the negative meniscus lens 2 of −200 mm, the amount of relative displacement required for correcting positional deviations of 1 mm of the camera caused by minute movements of the user's hand by the above-described optical axis correction lens device is as shown in the chart of FIG. 3. In FIG. 3, the positional deviations are assumed to be in the positive direction so that the compensation amounts are shown in relation to the minus axis.

Figure 4:
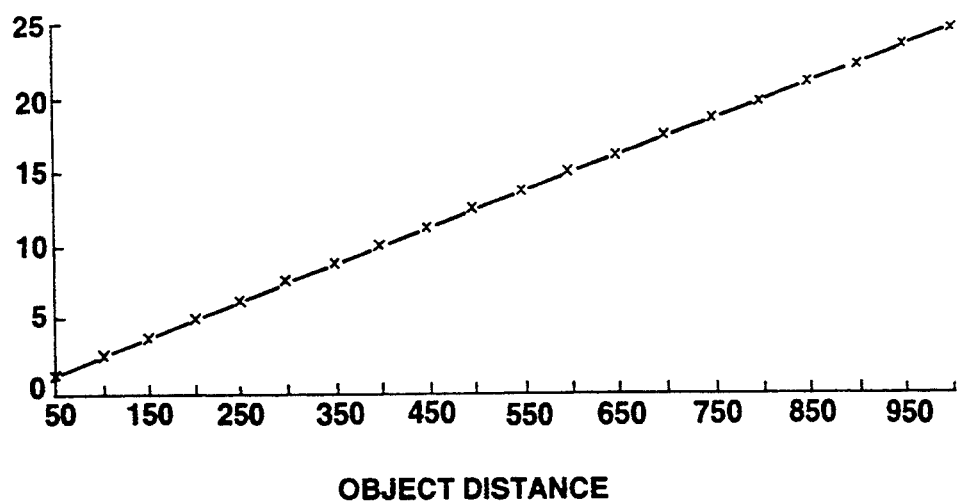
FIG. 4 is a chart showing an amount of the oscillations of the camera device held by the user's hand, which may be corrected with a displacement of 5.5 mm by the optical axis correction lens device shown in FIG. 1.

On the other hand, the extent of the positional deviations that may be corrected by a lens displacement of 5 mm is represented in the chart of FIG. 4.

Figure 5:
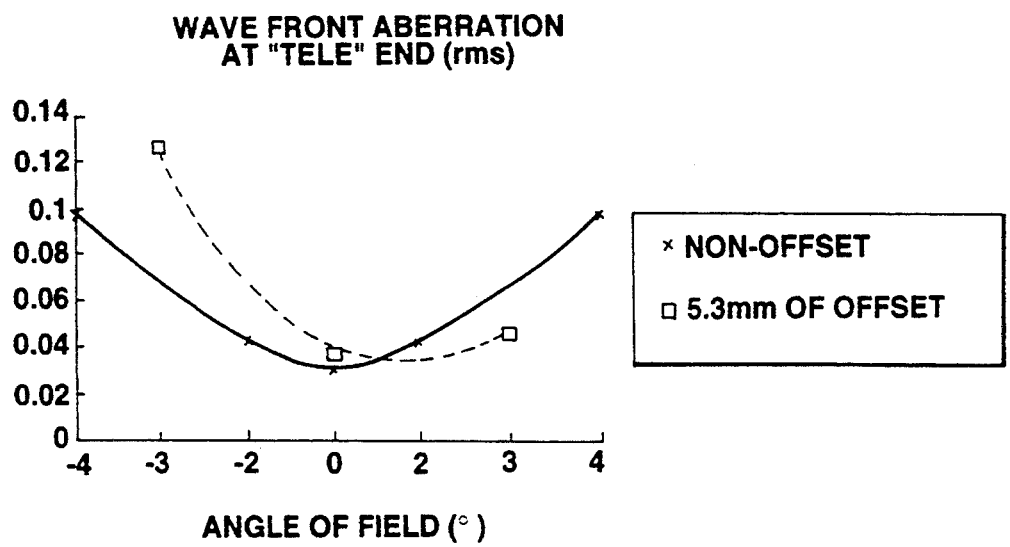
FIG. 5 is a chart showing aberration characteristics at a "tele" end with the imaging light not offset and with the image pickup light offset by 5.3 mm with the optical axis correction lens device shown in FIG. 1.

The aberration performances in rmsλ at a "tele" end (half angle of field of 2.9°) in one case when neither the positive meniscus lens 1 nor the negative meniscus lens 2 is driven, that is, the lenses are not offset, and in another case when only the negative meniscus lens 2 is offset by 5.37 mm, are shown in the chart of FIG. 5. On the other hand, the aberration performances in rmsλ at a "wide" end (half angle of field of 28°) in the case when neither the positive meniscus lens 1 nor the negative meniscus lens 2 is driven, that is, the lenses are not offset, and in the case when only the negative meniscus lens 2 is offset by 5.37 mm, are as shown in the chart of FIG. 6.

Figure 6:
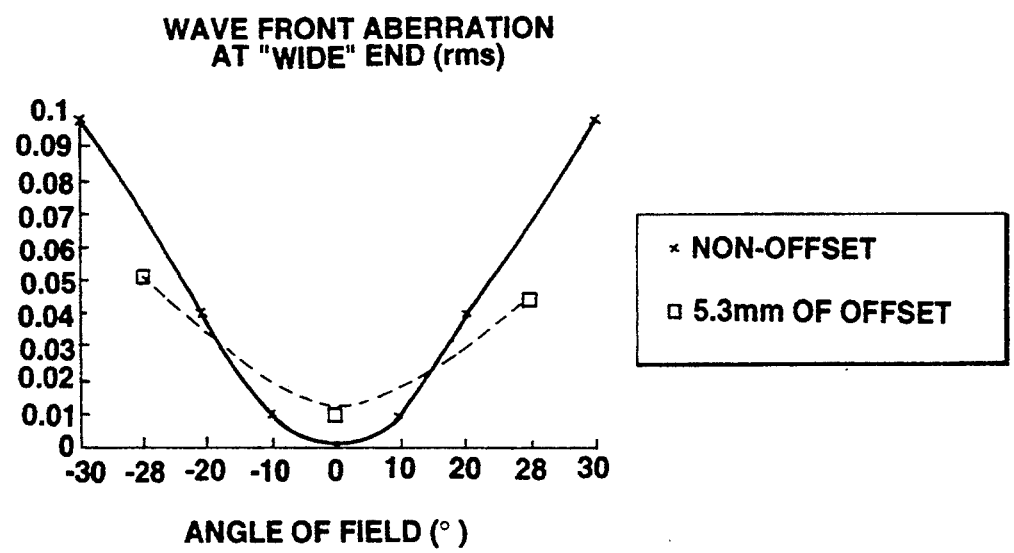
FIG. 6 is a chart showing aberration characteristics at a "wide" end with the image pickup light not offset and with the image pickup light offset by 5.3 mm with the optical axis correction lens device shown in FIG. 1.

It is seen from the plots of FIGS. 5 and 6 that if only the meniscus lens 2 is offset by 5.37 mm, the image pickup light is deflected by 1.5°. Thus, the aberration produced by such condition has the performance which comes close to the diffraction value limit. FIGS. 5 and 6 confirm that the chromatic aberration is not severely worsened by the present invention and FIG. 6 shows specifically that the chromatic aberration is still below the upper limit of 1.5°.

Figure 7:
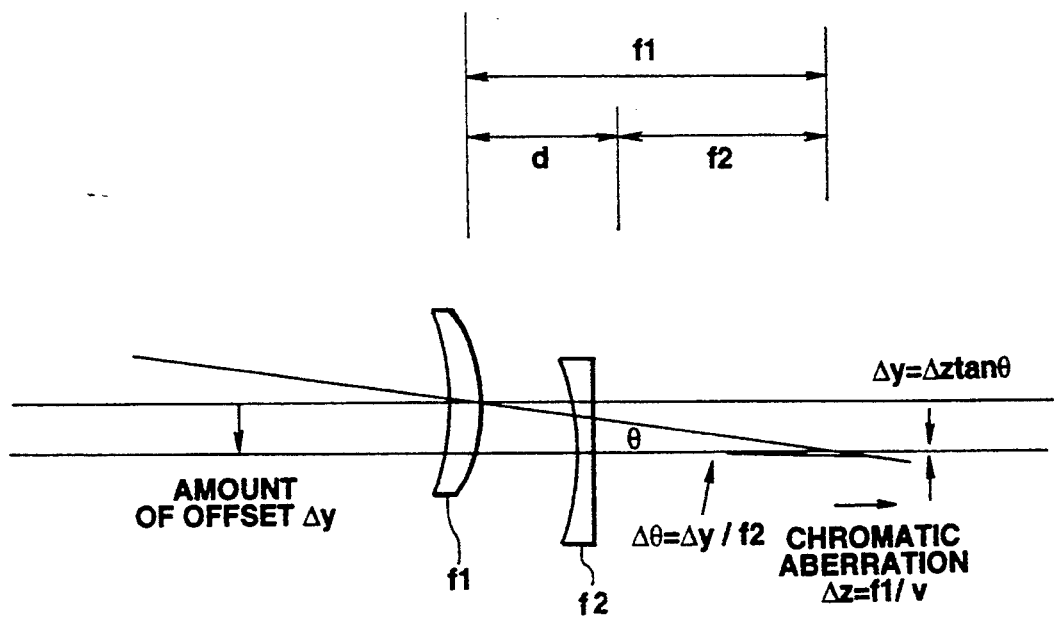
FIG. 7 is a schematic illustrating the principle of removing chromatic aberration with the positive meniscus lens and the negative meniscus lens provided in the optical axis correction lens device shown in FIG. 1.

If the optical axis correction is performed by controlling the position of the positive meniscus lens 1 and the negative meniscus lens 2, an error $\Delta\Theta$ of the angle of deflection is produced by the chromatic aberration $\Delta z$ of the positive meniscus lens (f1), as shown in FIG. 7. The quantity of the chromatic aberration $\Delta z$ may be estimated from the Abbe's number $\nu$. The Abbe's number $\nu$ is defined from the refractive index of the optical material of the positive meniscus lens 1 at the C-rays, F-rays and, d-rays of 656.28 nm, 486.13 nm and 587.56 nm, respectively, by the following formula.

$$\nu = (nd-1)/(nF-nC)$$

It follows from this that the chromatic aberration between the C-rays and the D-rays $\Delta z$ is given by $\Delta z = f1/\nu$. Substituting f1=205 mm and $\nu$=57, the chromatic aberration $\Delta z$ becomes $\Delta z$=205 mm/57=3.6 mm. Since the error $\Delta\Theta$ of the angle of deflection becomes $\Delta\Theta = \Delta z \tan\Theta/f2$ = 3.6 mm tan 1.5°/200 mm=4.7e - 4, then the chromatic aberration $\Delta Y$=f tan $\Delta\Theta$=28 μm, This estimated value roughly coincides with the results of measurement with the universal optical designing software CODEV.

To summarize the above, the following equation (7) holds.

$$\begin{aligned} \Delta Y &= f\tan\Delta\Theta \\ &= f\Delta z \tan\Theta/f2 = ff1/\nu\tan\Theta/f2 \\ &= f1/f2\,f\tan\Theta/\nu \sim f\tan\Theta/\nu \end{aligned} \quad (7)$$

The color aberration on the CCD image sensor 4 is the quotient of the maximum amount of image movement by the Abbe's number of the positive meniscus lens 1. Since the Abbe's number $\nu$ is on the order of $\nu$=60, even with the use of a low diffusion material, a chromatic aberration equal to 1/60 of the maximum amount of the image movement is produced. Nevertheless, if the positive meniscus lens 1 is an achromatic lens, the Abbe's number may be equivalently increased to an extremely large value.

Figure 8:
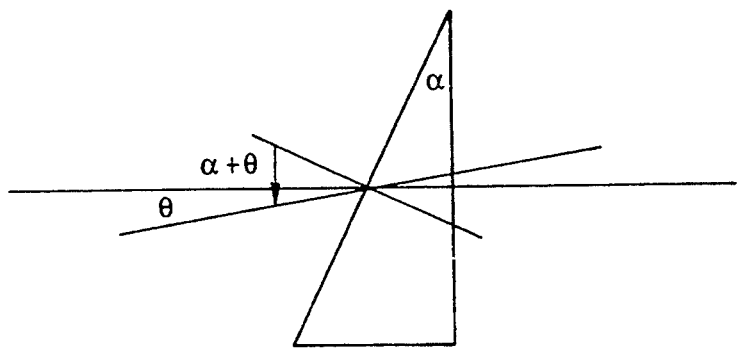
FIG. 8 is a schematic illustrating the value of chromatic aberration produced when the optical axis correction system is constructed by a sole meniscus lens.

The chromatic aberration of the optical axis correcting system correcting the optical axis by the active prism is as shown in FIG. 8 and by the following equations:

$$\sin(\alpha+\Theta) = n\sin\alpha$$

$$\cos(\alpha+\Theta)d\Theta/d\lambda = dn/d\lambda \sin\alpha$$

$$\begin{aligned} \Delta\Theta &= d\Theta/d\lambda\,\Delta\lambda \\ &= \sin\alpha/\cos(\alpha+\Theta)\Delta n \\ &= \sin\alpha/\cos\alpha(\alpha+\Theta)(n-1)/\nu \\ &= (n-1)/n\,\tan(\alpha+\Theta)/\nu \\ f\Delta\Theta &= (n-1)/n\,f\tan(\alpha+\Theta)/\nu \end{aligned}$$

If n=1.51, $\Theta$=1.53° for an apex angle $\alpha$ of 3°. Hence, $\alpha+\Theta$=4.53°~3 $\Theta$.

On the other hand, since (n−1)/n=0.337~⅓, (n−1)/n ftan($\alpha+\Theta$)/$\nu \sim$ ftan$\Theta$/$\nu$, the value of the chromatic aberration is approximately equal to the value of the chromatic aberration shown in equation (7). That is, the value of the chromatic aberration of the optical axis correction system the effects the optical axis correction by the above-mentioned active prism is substantially of the same order of magnitude as that of the optical axis correction system of the video camera according to the embodiment of the present invention in which the optical axis correction is performed by using two meniscus lenses 1, 2.

If the positive meniscus lens 1 is an achromatic lens, chromatic aberration in the direction of deflection of the image pickup light is removed. Moreover, if the negative meniscus lens 2 is an achromatic lens, chromatic aberration in directions other than the direction of deflection of the image pickup light is also removed.

It is seen from above that with the optical axis correction lens system provided in the video camera by providing the light incident and light outgoing surfaces of the positive meniscus lens 1 to be non-spherical, and providing the light incident and light outgoing surfaces of the negative meniscus lens i to be similarly non-spherical, it is possible to inhibit the generation of residual aberration.

Moreover, the positive meniscus lens 1 and the negative meniscus lens 2 make up an afocal optical system, optical axis correction may be properly performed regardless of the focal length. Consequently, the optical axis correction may be made without changing the zooming range and without affecting the focal length of the zoom lens 3.

Because the active prism formed by injecting a special liquid between two glass plates is not employed in the present invention, optical axis correction may be made accurately under reduced atmospheric pressure without the inconvenience of generating air bubbles in any such liquid.

Consequently, it is possible with the present invention to achieve accurate correction of positional deviations of the camera caused by minute movements of the user's hand.

The above-described favorable effects may be realized by setting the radii of curvature, thicknesses, refractive indices, conical coefficients, fourth order non-spherical coefficients, sixth-order non-spherical coefficients, eighth-order non-spherical coefficients and tenth-order non-spherical coefficients of the first to fourth surfaces of the afocal optical system constituted by the positive meniscus lens 1 and the negative meniscus lens 2, as shown in the following Tables 1 to 3.

TABLE 1

| SURFACE | RADIUS OF CURVATURE (mm) | THICKNESS | REFRACTIVE INDEX |
|---|---|---|---|
| FIRST SURFACE OF AFOCAL OPTICAL SYSTEM | −1185.1872 | 3 (mm) | 1.492838 |
| SECOND SURFACE OF AFOCAL OPTICAL SYSTEM | −91.49586 | 1 (mm) | 1 (AIR) |
| THIRD SURFACE OF AFOCAL OPTICAL SYSTEM | −51.94066 | 2 (mm) | 1.492838 |
| FOURTH SURFACE OF AFOCAL OPTICAL SYSTEM | −111.19628 |  | 1 (AIR) |

TABLE 2

| SURFACE | CONICAL COEFFICIENT |
|---|---|
| FIRST SURFACE OF AFOCAL OPTICAL SYSTEM | −63.65844 |
| SECOND SURFACE OF AFOCAL OPTICAL SYSTEM | 17.162173 |
| THIRD SURFACE OF AFOCAL OPTICAL SYSTEM | −30.70137 |
| FOURTH SURFACE OF AFOCAL OPTICAL SYSTEM | −125.587919 |

TABLE 3

| SURFACE | NON-SPHERICAL COEFFICIENT (4TH ORDER) | NON-SPHERICAL COEFFICIENT (6TH ORDER) | NON-SPHERICAL COEFFICIENT (8TH ORDER) | NON-SPHERICAL COEFFICIENT (10TH ORDER) |
|---|---|---|---|---|
| FIRST | −0.521794e-5 | −0.360458e-7 | 0.367265e-10 | −0.541548e-13 |
| SECOND | −0.191157e-5 | −0.356454e-7 | 0.726133e-10 | −0.122939e-12 |
| THIRD | −0.462856e-5 | −0.451322e-7 | −0.13534e-9 | 0.1470635e-12 |
| FOURTH | 0.849493e-5 | −0.628415e-8 | 0.736649e-11 | −0.300864e-13 |

In the above Tables 1, 2, and 3, the first, third and the fourth surfaces of the afocal optical system are approximately rotational hyperboloids, while the second surface is approximately a rotational ellipsoid or obtate spheroid.

On the other hand, the focal length of the positive meniscus lens 1 and that of the negative meniscus lens 2 are 201 mm and −200 mm, respectively.

The above-described favorable effects may also be realized by setting the radii of curvature, thicknesses, refractive indices, conical coefficients, fourth order non-spherical coefficients, sixth-order non-spherical coefficients, eighth-order non-spherical coefficients and tenth-order non-spherical coefficients of the first to fourth surfaces of the afocal optical system constituted by the positive meniscus lens 1 and the negative meniscus lens 2 as shown in the following Tables 4, 5, and 6.

TABLE 4

| SURFACE | RADIUS OF CURVATURE (mm) | THICKNESS | REFRACTIVE INDEX |
|---|---|---|---|
| FIRST SURFACE OF AFOCAL OPTICAL SYSTEM | −996.23238 | 3 (mm) | 1.492838 |
| SECOND SURFACE OF AFOCAL OPTICAL SYSTEM | −90.5988 | 1 (mm) | 1 (AIR) |
| THIRD SURFACE OF AFOCAL OPTICAL SYSTEM | −46.08212 | 2 (mm) | 1.492838 |
| FOURTH SURFACE OF | −87.78203 |  | 1 (AIR) |

TABLE 4-continued

| SURFACE | RADIUS OF CURVATURE (mm) | THICKNESS | REFRACTIVE INDEX |
|---|---|---|---|
| AFOCAL OPTICAL SYSTEM | | | |

TABLE 5

| SURFACE | CONICAL COEFFICIENT |
|---|---|
| FIRST SURFACE OF AFOCAL OPTICAL SYSTEM | −2468.19433 |
| SECOND SURFACE OF AFOCAL OPTICAL SYSTEM | 15.964156 |
| THIRD SURFACE OF AFOCAL OPTICAL SYSTEM | −30.848783 |
| FOURTH SURFACE OF AFOCAL OPTICAL SYSTEM | −128.717973 |

TABLE 6

| SURFACE | NON-SPHERICAL COEFFICIENT (4TH ORDER) | NON-SPHERICAL COEFFICIENT (6TH ORDER) | NON-SPHERICAL COEFFICIENT (8TH ORDER) | NON-SPHERICAL COEFFICIENT (10TH ORDER) |
|---|---|---|---|---|
| FIRST | −0.494236e-5 | −0.335883e-7 | 0.294516e-10 | −0.712148e-13 |
| SECOND | −0.133806e-5 | −0.362975e-7 | 0.836518e-10 | −0.189069e-12 |
| THIRD | −0.459412e-5 | −0.423001e-7 | −0.129389e-9 | 0.148924e-12 |
| FOURTH | 0.811785e-5 | −0.524809e-8 | 0.214801e-11 | −0.515843e-14 |

In the above Tables 4, 5, and 6, the first, third and the fourth surfaces of the afocal optical system are approximately rotational hyperboloids, while the second surface is approximately a rotational ellipsoid or obtate spheroid.

On the other hand, the focal length of the positive meniscus lens 1 and that of the negative meniscus lens 2 are 202 mm and −200 mm, respectively.

The above-described favorable effects may also be realized by setting the radii of curvature, thicknesses, refractive indices, conical coefficients, fourth order non-spherical coefficients, sixth-order non-spherical coefficients, eighth order non-spherical coefficients and tenth-order non-spherical coefficients of the first to fourth surfaces of the afocal optical system constituted by the positive meniscus lens 1 and the negative meniscus lens 2, as shown in the following Tables 7, 8, and 9.

TABLE 7

| SURFACE | RADIUS OF CURVATURE (mm) | THICKNESS | REFRACTIVE INDEX |
|---|---|---|---|
| FIRST SURFACE OF AFOCAL OPTICAL SYSTEM | −613.59483 | 3 (mm) | 1.492838 |
| SECOND SURFACE OF AFOCAL OPTICAL SYSTEM | −86.15944 | 1 (mm) | 1 (AIR) |
| THIRD SURFACE OF AFOCAL OPTICAL SYSTEM | −42.73198 | 2 (mm) | 1.492838 |
| FOURTH SURFACE OF AFOCAL OPTICAL SYSTEM | −76.60105 | | 1 (AIR) |

TABLE 8

| SURFACE | CONICAL COEFFICIENT |
|---|---|
| FIRST SURFACE OF AFOCAL OPTICAL SYSTEM | −2530.91174 |
| SECOND SURFACE OF AFOCAL OPTICAL SYSTEM | 14.790912 |
| THIRD SURFACE OF AFOCAL OPTICAL SYSTEM | −29.302588 |
| FOURTH SURFACE OF AFOCAL OPTICAL SYSTEM | −115.775691 |

TABLE 9

| SURFACE | NON-SPHERICAL COEFFICIENT (4TH ORDER) | NON-SPHERICAL COEFFICIENT (6TH ORDER) | NON-SPHERICAL COEFFICIENT (8TH ORDER) | NON-SPHERICAL COEFFICIENT (10TH ORDER) |
|---|---|---|---|---|
| FIRST | −0.544656e-5 | −0.351522e-7 | 0.419062e-10 | −0.152003e-12 |
| SECOND | −0.805056e-6 | −0.368041e-7 | 0.753328e-10 | −0.196851e-12 |
| THIRD | −0.442550e-5 | −0.394558e-7 | −0.118486e-9 | 0.135464e-12 |
| FOURTH | 0.777955e-5 | −0.226930e-8 | 0.172622e-10 | −0.229298e-13 |

In the above Tables 7, 8, and 9, the first, third and the fourth surfaces of the afocal optical system are approximately rotational hyperboloids, while the second surface is approximately a rotational ellipsoid or obtate spheroid.

On the other hand, the focal length of the positive meniscus lens 1 and that of the negative meniscus lens 2 are 203 mm and −200 mm, respectively.

The above-described favorable effects may also be realized by setting the radii of curvature, thicknesses, refractive indices, conical coefficients, fourth order non-spherical coefficients, sixth-order non-spherical coefficients, eighth-order non-spherical coefficients and tenth-order non-spherical coefficients of the first to fourth surfaces of the afocal optical system constituted by the positive meniscus lens 1 and the negative meniscus lens 2 as shown in the following Tables 10, 11, and 12.

TABLE 10

| SURFACE | RADIUS OF CURVATURE (mm) | THICKNESS | REFRACTIVE INDEX |
| --- | --- | --- | --- |
| FIRST SURFACE OF AFOCAL OPTICAL SYSTEM | −275.242 | 3 (mm) | 1.492838 |
| SECOND SURFACE OF AFOCAL OPTICAL SYSTEM | −74.16998 | 1 (mm) | 1 (AIR) |
| THIRD SURFACE OF AFOCAL OPTICAL SYSTEM | −39.12113 | 2 (mm) | 1.492838 |
| FOURTH SURFACE OF AFOCAL OPTICAL SYSTEM | −65.96111 | | 1 (AIR) |

TABLE 11

| SURFACE | CONICAL COEFFICIENT |
| --- | --- |
| FIRST SURFACE OF AFOCAL OPTICAL SYSTEM | 311.595366 |
| SECOND SURFACE OF AFOCAL OPTICAL SYSTEM | 15.16998 |
| THIRD SURFACE OF AFOCAL OPTICAL SYSTEM | −25.30828 |
| FOURTH SURFACE OF AFOCAL OPTICAL SYSTEM | −79.220816 |

TABLE 12

| SURFACE | NON-SPHERICAL COEFFICIENT (4TH ORDER) | NON-SPHERICAL COEFFICIENT (6TH ORDER) | NON-SPHERICAL COEFFICIENT (8TH ORDER) | NON-SPHERICAL COEFFICIENT (10TH ORDER) |
| --- | --- | --- | --- | --- |
| FIRST | −0.430396e-5 | −0.359841e-7 | 0.445597e-10 | −0.120117e-12 |
| SECOND | −0.888377e-5 | −0.315414e-7 | 0.596615e-10 | −0.144751e-12 |
| THIRD | −0.543052e-5 | −0.476997e-7 | −0.136583e-9 | 0.146545e-12 |
| FOURTH | 0.846283e-5 | −0.752038e-8 | 0.156369e-10 | −0.39786e-13 |

In the above Tables 10, 11, and 12, the first and second surfaces of the afocal optical system are approximately rotational hyperboloids, while the third and fourth surfaces thereof are approximately rotational ellipsoids or obtate spheroids.

On the other hand, the focal lengths f1, f2 of the positive meniscus lens 1 and that of the negative meniscus lens 2 are 205 mm and −200 mm, respectively. Accordingly, the ratios of the respective surfaces $\gamma 1$, $\gamma 2$, $\gamma 3$, $\gamma 4$ of the afocal optical system and the focal lengths f1, f2 are as follows.

In the first example as shown in Tables 1, 2, and 3 other ratios are:

r1/f1 = −5.896; r2/f1 = −0.455 r3/f2 = 0.259; r4/f2 = 0.556

In the second example as shown in Tables 4, 5, and 6 the ratios are:

r1/f1 = −4.932; r2/f1 = −0.449 r3/f2 = 0.230; r4/f2 = 0.439

In the third example as shown in Tables 7, 8, and 9 the ratios are:

r1/f1 = −3.023; r2/f1 = −3.023 r3/f2 = 0.214; r4/f2 = 0.383

In the fourth example as shown in Tables 10, 11, and 12 the ratios are:

r1/f1 = −1.343; r2/f1 = −0.362 r3/f2 = 0.196; r4/f2 = 0.330

From the above ratios then it is seen that the ratio of r1/f1 has a range of values between −5.9 and −1.3; r2/f1 has a range of values between −0.46 and −0.36; r3/f2 has a range of values between 0.19 and 0.26; and r4/f2 has a range of values between 0.33 and 0.56.

Figure 9:
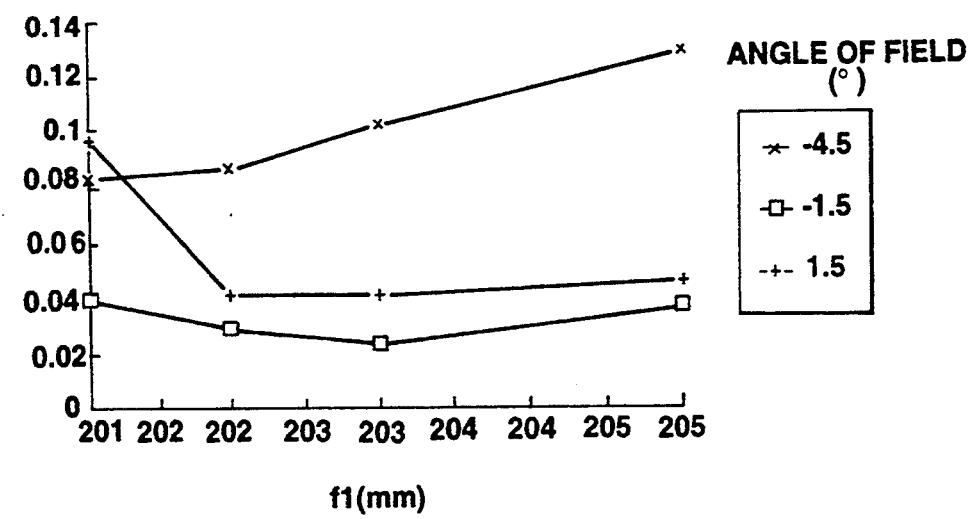
FIG. 9 is a chart showing an rms wave front aberration in an afocal optical system provided in the optical axis correction lens device shown in FIG. 1.
Figure 10:
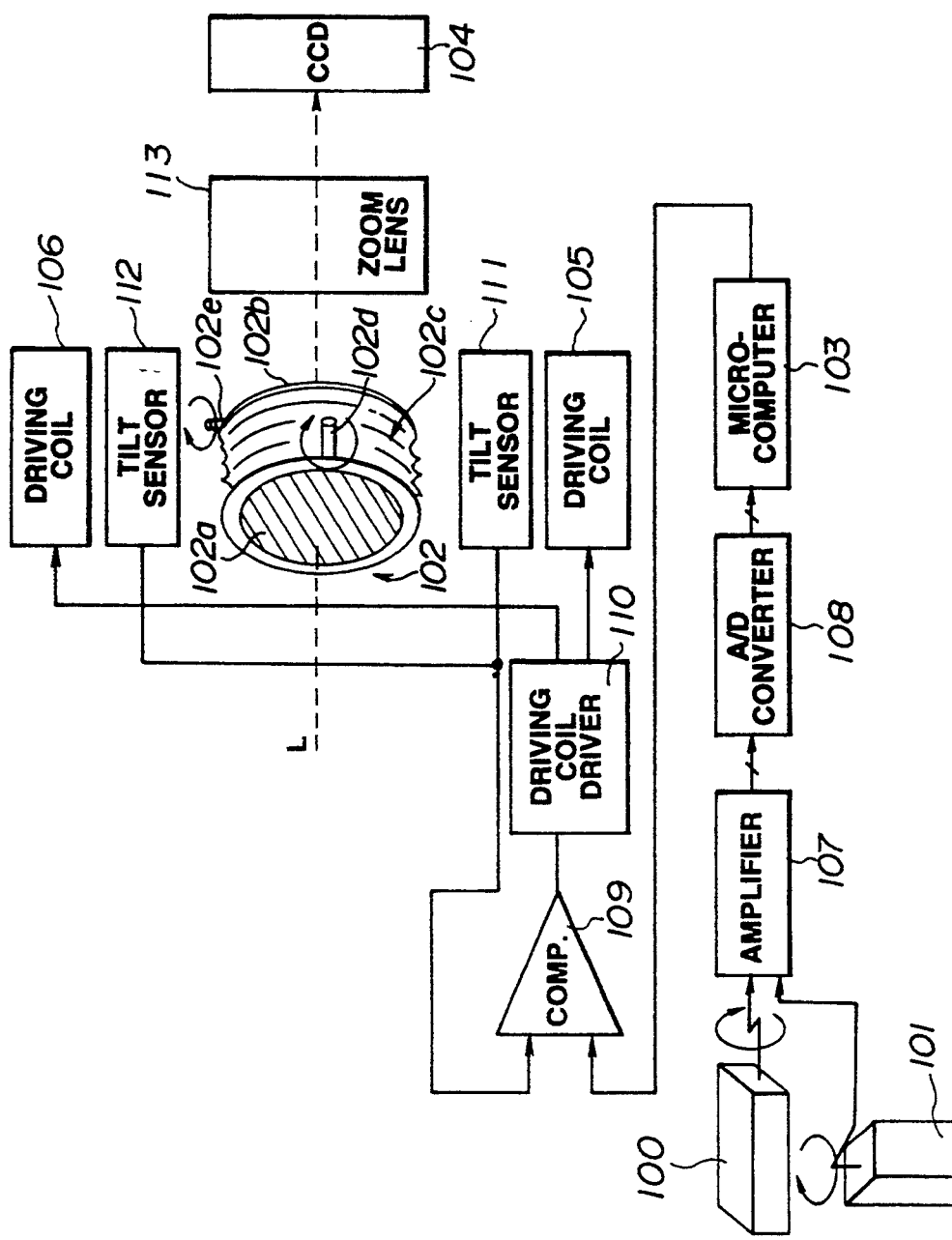
FIG. 10 is a block diagram of a conventional optical axis correction lens system.

In FIG. 9, rms$\lambda$ values of the wave front aberration generated for an incident parallel beam of an angle of field of +1.5°, −1.5° and 4.5° are plotted when the negative meniscus lens 2 is offset 5.3 mm with respect to the positive meniscus lens 1 and the afocal optical system is configured as shown in Tables 1 to 3, Tables 4 to 6, Tables 7 to 9, or Tables 10 to 12.

It is seen from the chart of FIG. 9 that the aberration produced when the angle of inclination of the optical axis is deflected by 1.5° over an angle of field of ±3° is optimum for any of the above-mentioned characteristics of the optical system.

Although the positive and negative meniscus lenses 1, 2 are driven in accordance with the detected amount of the positional deviations of the camera caused by minute oscillations of the holder's hand, it is also possible to have only one of the positive and negative meniscus lenses driven, in which case the driven lens may be driven in both the perpendicular and horizontal directions with respect to the optical axis by way of effecting optical axis correction.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. An optical axis correction device for a camera having an optical axis, comprising:
   a negative meniscus lens in which at least one of a light incident surface and light outgoing surface is non-spherical, a positive meniscus lens in which at least one of a light incident surface and light outgoing surface is non-spherical;

said negative meniscus lens and said positive meniscus lens forming an afocal optical system; and lens driving means for driving one of said negative meniscus lens and said positive meniscus lens in a direction perpendicular to the optical axis of the camera in response to externally applied optical axis correction signals, thereby effecting optical axis correction.

2. The optical axis correction device as claimed in claim 1, wherein said negative meniscus lens and said positive meniscus lens are selected as achromatic compound lenses for correcting chromatic aberration caused during optical axis correction.

3. The optical axis correction lens device as claimed in claim 1, wherein said positive meniscus lens is convex toward a light outgoing side and said negative meniscus lens is convex toward a light incident side.

4. The optical axis correction lens device as claimed in claim 1, wherein said negative meniscus lens is arranged downstream of said positive meniscus lens along a light path of an image pickup light.

5. The optical axis correction lens device as claimed in claim 1, wherein said positive meniscus lens has a focal length f1 and said negative meniscus lens has a focal length f2 and radii of curvature of a first surface $\gamma 1$ of said positive meniscus lens, a second surface $\gamma 2$ of said positive meniscus lens, a third surface $\gamma 3$ of said negative meniscus lens, and a further surface $\gamma 4$ of said negative meniscus lens are selected within ranges of:

$-5.896 < r1/f1 < -1.3$ $-0.46 < r2/f1 < -0.36$ $0.19 < r3/f2 < 0.26$ $0.33 < r4/f2 < 0.56$, wherein r1, r2, r3, and r4 are radii of curvature of the respective lens surfaces and the first to fourth surfaces are selected to be non-spherical surfaces, the first surface having an approximate non-spherical shape of one of a rotational hyperboloid and an obtate spheroid, the second surface having an approximate non-spherical shape of an obtate spheroid, the third surface having an approximate non-spherical shape of a rotational hyperboloid, and the fourth surface having an approximate non-spherical shape of a rotational hyperboloid.

6. The optical axis correction lens device as claimed in claim 1, wherein the afocal optical system is made up of first and second surfaces of said negative meniscus lens and third and fourth surfaces of said positive meniscus lens, in which:

the first surface of said afocal optical system has a thickness of 3 mm, a radius of curvature of $-1185.1872$ mm to $-275.242$ mm, a refractive index of 1.492838, a conical coefficient of $-2530.91174$ to 311.595366, a fourth non-spherical coefficient of $-0.544656e - 5$ to $0.430396e - 5$, a sixth non-spherical coefficient of $-0.360458e - 7$ to $-0.335883e - 7$, an eighth non-spherical coefficient of $0.294516e - 10$ to $0.445597e - 10$ and a tenth non-spherical coefficient of $-0.712148e - 13$ to $-0.120117e - 12$, the second surface of said afocal optical system has a thickness of 1 mm, a radius of curvature of $-91.49586$ mm to $-74.16998$ mm, a refractive index of 1, a conical coefficient of 14.790912 to 17.162173, a fourth non-spherical coefficient of $-0.888377e - 5$ to $-0.133806e - 5$, a sixth non-spherical coefficient of $-0.368041e - 7$ to $-0.315414e - 7$, an eighth non-spherical coefficient of $0.836518e - 10$ to $0.596615e - 10$ and a tenth non-spherical coefficient of $-0.196851e - 12$ to $-0.122933e - 12$, the third surface of said afocal optical system has a thickness of 2 mm, a radius of curvature of $-51.94066$ mm to $-39.12113$ mm, a refractive index of 1.492838, a conical coefficient of $-30.848783$ to $-25.30828$, a fourth non-spherical coefficient of $-0.543052e - 5$ to $-0.442550e - 5$, a sixth non-spherical coefficient of $-0.476997e - 7$ to $-0.394558e - 7$, an eighth non-spherical coefficient of $0.136583e - 9$ to $-0.118486e - 9$ and a tenth non-spherical coefficient of $0.148924e - 12$ to $0.135464e - 12$, and the fourth surface of said afocal optical system has a radius of curvature of $-111.19628$ mm to $-65.96111$ mm, a refractive index of 1, a conical coefficient of $-128.717973$ to $-79.220816$, a fourth non-spherical coefficient of $0.849493e - 5$ to $0.777955e - 5$, a sixth non-spherical coefficient of $-0.752038e - 8$ to $-0.226930e - 8$, an eighth non-spherical coefficient of $0.172622e - 10$ to $0.156363e - 10$ and a tenth non-spherical coefficient of $-0.39786e - 13$ to $-0.515843e - 14$.

7. A camera including a camera body comprising:

image pickup means for receiving an image pickup light and producing an image pickup signal therefrom;

lens means for condensing said image pickup light on said image pickup means;

optical axis correction lens means provided upstream of said lens means along an optical axis of said image pickup means and including a negative meniscus lens having non-spherical light incident and light outgoing surfaces and a positive meniscus lens having non-spherical light incident and light outgoing surfaces;

lens driving means for driving said negative meniscus lens and said positive meniscus lens in a direction perpendicular to the optical axis;

means for detecting wobbling of the camera body; and means for controlling said lens driving means in response to an output of said detection means.

* * * * *

UNITED STATES PATENT AND TRADEMARK OFFICE
CERTIFICATE OF CORRECTION

PATENT NO. : 5,376,993

DATED : December 27, 1994

INVENTOR(S) : Shigeo Kubota and Michio Oka

It is certified that error appears in the above-indentified patent and that said Letters Patent is hereby corrected as shown below:

Col. 5, line 41 change "0.122933e" to --0.122939e--
Col. 10, line20, after "tan  " insert ⁻Δθ ∼ fΔθ --
Col. 11, line 22, change "lens i" to --lens 1--

In the claims:

Col. 18, line 1, after "to" insert -----
line 17, change "-0.122933e" to ---0.122939e--
line 36, change "0.156363e" to --0.156369e--

Signed and Sealed this

Third Day of September, 1996

Attest:

BRUCE LEHMAN

*Attesting Officer*   *Commissioner of Patents and Trademarks*